United States Patent [19]
Mori

[11] Patent Number: 5,322,674
[45] Date of Patent: Jun. 21, 1994

[54] METHOD OF TREATING WASTE GASES CONTAINING HALOGEN COMPOUNDS

[75] Inventor: Yoichi Mori, Kanagawa, Japan

[73] Assignees: Ebara Corporation, Tokyo; Ebara Research Co., Ltd., Fujisawa, both of Japan

[21] Appl. No.: 994,478

[22] Filed: Dec. 21, 1992

Related U.S. Application Data

[63] Continuation of Ser. No. 772,677, Oct. 7, 1991, abandoned.

[30] Foreign Application Priority Data

Oct. 19, 1990 [JP] Japan .................. 2-279324

[51] Int. Cl.$^5$ .......................... C01B 7/00; C01B 7/01; C01B 7/07
[52] U.S. Cl. .................. 423/240 S; 423/481; 423/488
[58] Field of Search ............ 423/488, 240 S, 481

[56] References Cited

U.S. PATENT DOCUMENTS

| | | | |
|---|---|---|---|
| 4,018,880 | 4/1977 | Correia et al. | 423/488 |
| 4,301,126 | 11/1981 | Duembgen et al. | 423/481 |
| 4,479,850 | 10/1984 | Beinvogl | 156/652 |
| 4,594,231 | 6/1986 | Nishino et al. | |
| 4,673,558 | 6/1987 | Senoue et al. | 423/240 S |
| 4,784,837 | 11/1988 | Kitayama et al. | 423/240 S |
| 4,861,578 | 8/1989 | Fukunaga et al. | 423/240 S |

FOREIGN PATENT DOCUMENTS

| | | |
|---|---|---|
| 0120604 | 10/1984 | European Pat. Off. |
| 0303368 | 2/1989 | European Pat. Off. |
| 56-155620 | 12/1981 | Japan ............ 423/240 S |
| 57-127424 | 8/1982 | Japan ............ 423/240 S |
| 62-121621 | 6/1987 | Japan |
| WO89/11329 | 11/1989 | PCT Int'l Appl. |

OTHER PUBLICATIONS

Patent Abstracts of Japan, vol. 11, No. 349 (C-456) [2796]; Nov. 14, 1987; p. 83 C 456; & JP-A-62 121 621; Jun. 2, 1987, H. Mizuno, et al., "Gas Adsorbing and Trapping Device".

Patent Abstracts of Japan, vol. 10, No. 185 (C-357) [2241], Jun. 27, 1986, p. 149 C 357; & JP-A-61 35 849; Feb. 20, 1986, H. Mizuno, et al., "Treatment Agent of Dry Etching Exhaust Gas".

Primary Examiner—Benjamin R. Fuller
Assistant Examiner—Valerie Ann Lund
Attorney, Agent, or Firm—Oblon, Spivak, McClelland, Maier & Neustadt

[57] ABSTRACT

Halogen-containing waste gases resulting from the dry etching step of the process of fabricating semiconductor devices are rendered harmless by removing the halogen compounds concomitant with said waste gases. Waste gases containing halogen compounds are treated by bringing them into contact first with activated carbon and then into contact with a member selected from the group consisting of an alkali agent and a ferric oxide, at a linear velocity of about 3–50 cm/min at ambient temperature, volume ratios of said activated carbon to the alkali agent or the ferric oxide in terms of a substantially dried base being about 2–4, and said alkali agent being selected from a group consisting of calcium hydroxide, calcium oxide, magnesium hydroxide and magnesium oxide.

1 Claim, 1 Drawing Sheet

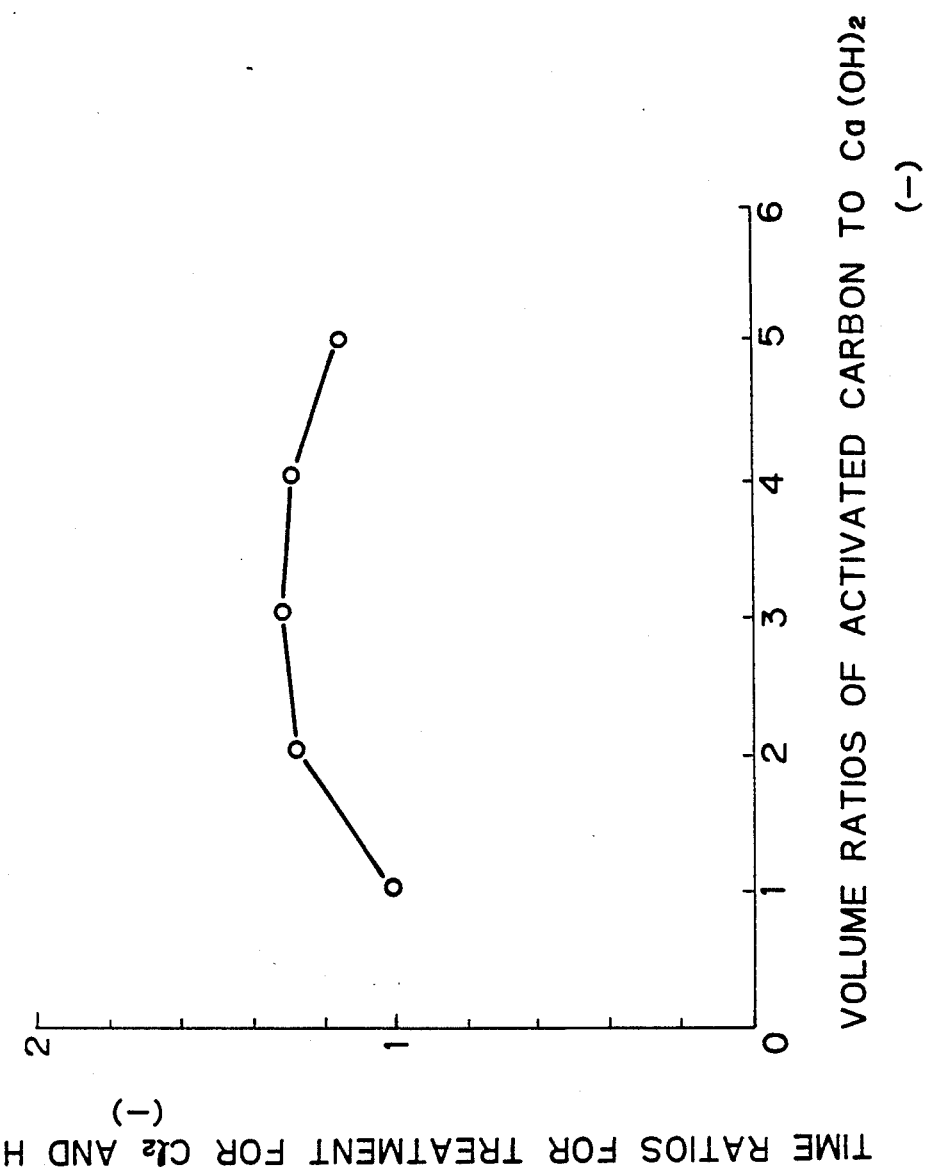

5,322,674

METHOD OF TREATING WASTE GASES CONTAINING HALOGEN COMPOUNDS

This application is a continuation of application Ser. No. 07/772,677, filed on Oct. 7, 1991, now abandoned.

BACKGROUND OF THE INVENTION

1. Field of the Invention

The present invention relates to a method of treating waste gases containing halogen compounds. More particularly, the present invention relates to a method by which halogen-containing waste gases resulting from the dry etching step of the process of fabricating semiconductor devices are rendered harmless by removing the halogen compounds concomitant with said waste gases.

2. Prior Art

Many kinds of deleterious gases are employed in the process of fabricating semiconductor devices and they are potential pollutants of the environment. Halogen-containing gases that are present in the waste gases from the dry etching step are very toxic to the human body and it is strongly desired to establish a method by which those gases can be removed effectively.

While several methods for removing halogen-containing gases have so far been proposed, "dry systems" employ the following treating agents: (1) metal oxides; (2) activated carbon or a chemical supported on activated carbon; (3) an alkali agent; and (4) an oxidizing agent. Included within the class of (1) are oxides of various metals; included within the class of (2) are absorbents having chlorides or hydroxides of alkaline earth metals supported on activated carbon; known examples of alkali agents (3) include $Ca(OH)_2$, $Mg(OH)_2$, CaO and MgO; and a known example of oxidizers (4) is $KMnO_4$.

The halogen-containing gases that are discharged from the dry etching step are classified as the following three types; (1) oxidizing gases (e.g. $Cl_2$ and $Br_2$); (2) acidic gases (e.g. HCl and $SiF_4$); and (3) organic chlorine-containing gases (e.g. $CCl_4$ and $CHCl_3$). In practice, these gases are rarely discharged individually and a plurality of gases having different properties are discharged simultaneously.

In the prior art, there is no single treating agent that is effective in treating all of those halogen-containing gases. For example, metal oxides, alkali agents and oxidizing agents are not capable of removing all oxidizing and organic chlorine-containing gases whereas activated carbon is not capable of removing all acidic gases. In the absence of a single agent that is capable of treating all halogen-containing gases, it is necessary to select an appropriate agent for each waste gas to be treated but this is not only a difficult and cumbersome task; the throughput of the treatment is also small.

Japanese Patent Laid-Open Publication Nos. 121621/1987 and 289222/1987 disclose the use of soda lime as an alkali agent but this has the following problems.

If wafers are contaminated by Na, the electrical properties of semiconductors become very unstable to lower the yield of acceptable products. Under these circumstances, utmost care is taken in semiconductor shops to prevent wafer contamination by requiring that the operating personnel wash their hands and wear masks, gloves and other protectors. Equipment for removing deleterious gases is not an exception. If Na-based treating agents are used, a Na-containing waste gas may flow back in an accident to potentially contaminate wafers. Hence, the use of Na-based treating agents is avoided as much as possible in semiconductor shops.

Furthermore, when a strong alkali agent such as soda lime is used, it reacts with a halogen gas and the resulting heat will cause water to be formed in a large amount, whereupon the individual particles of the agent will cohere together. If this occurs, the resistance to gas flow will increase and, in an extreme case, clogging occurs and the gas will no longer flow. For these reasons, the use of soda lime as an alkali agent is not preferred.

SUMMARY OF THE INVENTION

It is an object of the present invention is to provide a method by which a plurality of halogen-containing waste gases having different properties can be treated in an effective way even if they are discharged simultaneously.

Other objects and advantages of the present invention will be become apparent to those skilled in the art from the following description and disclosure.

BRIEF DESCRIPTION OF THE DRAWINGS

FIG. 1 is a graph showing the relationship between volume ratios of activated carbon to $Ca(OH)_2$ and time ratios for treatment for $Cl_2$ and HCl wherein the time for treatment for $Cl_2$ and HCl obtained when the volume ratio of activated carbon to $Ca(OH)_2$ is one, is expressed as one.

DETAILED DESCRIPTION OF THE PREFERRED EMBODIMENTS

This object of the present invention can be attained by bringing halogen compound containing waste gases into contact first with activated carbon in a granular form having particle sizes of about 3–32 mesh at a linear velocity of about 3–50 cm/min at ambient temperature and then into contact with a member selected from the group consisting of an alkali agent and a ferric oxide ($Fe_2O_3$) in a granular form having particle sizes of about 3–32 mesh at a linear velocity of about 3–50 cm/min at ambient temperature, volume ratios of said activated carbon to the alkali agent or the ferric oxide in terms of a substantially dried base being about 2–4, and said alkali agent being selected from the group consisting of calcium hydroxide, calcium oxide, magnesium hydroxide and magnesium oxide.

In accordance with the present invention, a mixture of halogen containing waste gases (e.g. oxidizing gases, acidic gases and organic chlorine-containing gases) is first brought into contact with activated carbon so that the individual components are fixed by physical adsorption or reactive adsorption. Subsequently, acidic gases that are released as by-products as well as some acidic gases (e.g. HCl and $SiF_4$) that are difficult to remove with activated carbon are completely removed by contact with an alkali agent or ferric oxide, whereby the waste gases are rendered harmless.

The activated carbon to be used in the present invention is preferably derived from coconut shells and it preferably has a specific surface area of 1000–1500 $m^2/g$. The alkali agent to be used in the present invention is preferably at least one alkaline earth metal compound selected from among calcium hydroxide, calcium oxide, magnesium hydroxide and magnesium oxide. The compounds are substantially free from the problems associated with Na-based agents and hence can be used in practice with satisfactory results. Further they undergo a mild reaction and will not generate an much heat as soda lime. Hence, the particles of such compounds will not cohere to a significant extent.

Halogen-containing gases that can be treated by the method of the present invention are those which contain at least one of the following halogen compounds: $Cl_2$, $F_2$, $Br_2$, HCl, HBr, $BCl_3$, $SiF_4$, $SiCl_4$, $WF_6$, $CCl_4$, $CHCl_3$, etc.

Mechanism of Action

When halogen-containing gases are brought into contact with activated carbon, organic chlorine-containing gases are fixed by physical adsorption whereas some of the oxidizing and acidic gases are fixed by reactive adsorption. At the same time, additional acidic gases are released as by-products. An example of the reaction between $Cl_2$ and activated carbon is expressed as follows:

$$2Cl_2 + 2H_2O \rightarrow 4HCl + O_2.$$

As a result of reaction with activated carbon, HCl is released. Such a by-product gas and other acidic gases such as HCl and $SiF_4$ that are produced in the etching reaction cannot be treated with activated carbon but they can be completely fixed on fluorides or chlorides by subsequent contact with the alkali agent or a ferric oxide.

The activated carbon to be used in the present invention may be derived from coconut shells, with a specific surface area of 1000–1500 $m^2/g$. The alkali agent to be used in the present invention is preferably an alkaline earth metal compound such as calcium hydroxide, calcium oxide, magnesium hydroxide or magnesium oxide.

On the condition that an undesirably high pressure loss not occur in the passage of waste gases, the particles of those treating agents are as small as possible, desirably in the range of about 3–32 mesh and preferably about 7–16 mesh, in order to insure a large surface area.

In practice, a column may be packed with two stages of treating agents (activated carbon and ferric oxide) in about 2–4 volume ratios of the activated carbon to the ferric oxide; then, the waste gases are supplied into the column either downward or upward so that they are brought into contact first with the activated carbon, then with the ferric oxide.

EXAMPLES

The following examples are provided for the purpose of further illustrating the present invention but are in no way to be taken as limiting.

Example 1 and Comparative Examples 1 and 2

A polyacrylic vessel (40 mm$\phi$) was packed with three different treating agents to a height of 50 mm and supplied with various $N_2$ diluted halogen-containing gases individually at a flow rate of 0.3 L/min (24 cm/min as linear velocity). The concentrations of each gas at the inlet of the column was 1%. The treatment was continued until the concentration of each gas detected at the outlet exceeded its permissible level (TLV) and the throughput of treatment was determined from the cumulative volume of each gas and the amount of each treating agent packed.

The treating agents used were commercial products in a granular form having particle sizes of 7–16 mesh.

The results are shown in Table 1. Activated carbon exhibited high throughputs in the treatment of oxidizing gases (e.g. $Cl_2$ and $Br_2$) and organic chlorine-containing gases (e.g. $CCl_4$ and $CHCl_3$) but it was not very effective in treating acidic gases (e.g. HCl and $SiF_4$). On the other hand, $Ca(OH)_2$ and $Fe_2O_3$ exhibited high throughputs in the treatment of acidic gases but they were little effective in removing organic chlorine-containing gases. They also were not very effective in treating oxidizing gases.

When $Cl_2$ was treated with activated carbon, HCl was detected at the outlet before $Cl_2$ was detected and this indicated the release of HCl as the result of reaction with activated carbon.

TABLE 1

| | | Example 1 Activated carbon | Comparative Example 1 $Ca(OH)_2$ | Comparative Example 2 $Fe_2O_3$ |
|---|---|---|---|---|
| Through- | $Cl_2$ | 48 | 38 | 2.0 |
| put (L/L) | $Br_2$ | 70 | 1.6 | 3.7 |
| | HCl | 9.5 | 70 | 90 |
| | $SiF_4$ | 8.7 | 24 | 35 |
| | $CCl_4$ | 40 | 0 | 0 |
| | $CHCl_3$ | 40 | 0 | 0 |

Examples 2 and 3 and Comparative Examples 3–5

A polyacrylic vessel (40 mm$\phi$) was divided into two stages, one of which was packed with activated carbon to a height of 200 mm and the other being packed with $Fe_2O_3$ to a height of 100 mm (Example 2). Another polyacrylic vessel (40 mm$\phi$) was divided into two stages, one of which was packed with activated carbon to a height of 200 mm and the other being packed with $Ca(OH)_2$ to a height of 100 mm (Example 3). In Comparative Examples 3–5, polyacrylic vessels (40 mm$\phi$) were packed with activated carbon, $Ca(OH)_2$ and $Fe_2O_3$, respectively, to a height of 300 mm. The treating agents, i.e., activated carbon, $Ca(OH)_2$ and $Fe_2O_3$, were of the same types as used in Example 1 and Comparative Examples 1 and 2.

A $N_2$ diluted gaseous mixture of $Cl_2$ and $SiF_4$ was supplied into each of the packed vessels at a flow rate of 0.3 l/min. In Examples 2 and 3, the feed gas was introduced in such a way that it would first pass through the layer of activated carbon. The concentrations of $Cl_2$ and $SiF_4$ were each 1% at the inlet of the vessel.

The time of treatment required for $Cl_2$ and acidic gases to be detected at the outlet of the vessel was measured and the results are shown in Table 2. Being packed in the same amount, the combination of activated carbon and $Fe_2O_3$ could be used for the longest time of treatment and the combination of activated carbon and $Ca(OH)_2$ could be used for the second longest time. Hence, it was verified that the combination of activated carbon and $Fe_2O_3$ or $Ca(OH)_2$ was more effective than using those treating agents individually.

TABLE 2

| | Treating agent | | Amount of packing (ml) | Time of treatment (min) |
|---|---|---|---|---|
| Example 2 | First stage | activated carbon | 250 | 1500 |
| | Second stage | $Fe_2O_3$ | 125 | |
| Example 3 | First stage | activated carbon | 250 | 1400 |

TABLE 2-continued

| | Treating agent | Amount of packing (ml) | Time of treatment (min) |
|---|---|---|---|
| | Second stage $Ca(OH)_2$ | 125 | |
| Comparative Example | | | |
| 3 | Activated carbon | 375 | 700 |
| 4 | $Ca(OH)_2$ | 375 | 900 |
| 5 | $Fe_2O_3$ | 375 | 60 |

Example 4

In order to establish the optimum volume ratio of charging of activated carbon to an alkali agent or ferric oxide, treating agents having various volume ratios of the activated carbon to $Ca(OH)_2$ were tested on a waste gas containing halogen compounds.

A polyacrylic vessel (40 ml, internal volume: 250 ml) was charged into two stages with the volume ratios of the activated carbon to $Ca(OH)_2$ being 5-1. The treating agents, i.e., activated carbon and $Ca(OH)_2$ were of the same type as used in Example 1.

A $N_2$ diluted gaseous mixture $Cl_2$ and HCl was supplied into each of the packed vessels at a flow rate of 0.3 l/min. The feed gas was introduced in such a way that it would first pass through the layer of activated carbon and then pass through the layer of $Ca(OH)_2$ in that order. The concentration of $Cl_2$ and HCl were each 1% at the inlet of the vessel. The time of treatment required for $Cl_2$ and HCl gases to be detected at the outlet of the vessel was measured and the results are shown in FIG. 1 wherein the time for treatment for $Cl_2$ and HCl obtained when the volume ratio of activated carbon to $Ca(OH)_2$ in terms of a substantially dried base is one is expressed as one. From the FIG. 1, it was verified that about 2-4 volume ratios of the activated carbon to $Ca(OH)_2$ serve greater treating effects.

Advantages of the Invention

According to the present invention, a plurality of halogen-containing gases having different properties can be effectively treated even if they are discharged simultaneously as waste gases. Further, the treating agents used in the method of the present invention have such a high throughput that they need not be replaced for a prolonged period of time.

What is claimed is:

1. A method of treating waste gases comprising the steps of: 1) bringing a mixture of waste gases comprising $Cl_2$ and $SiF_4$ in contact first with activated carbon in a granular form having particle sizes of about 3-32 mesh at a linear velocity of about 3-50 cm/min at ambient temperature wherein HCl, a by-product gas of said $Cl_2$ and carbon, is released and; 2) bringing said gases into contact with a member selected from the group consisting of calcium hydroxide and ferric oxide in granular form having particle sizes of 3-32 mesh and a linear velocity of about 3-50 cm/min at ambient temperature, a volume ratio of said activated carbon to either the calcium hydroxide or the ferric oxide being about 2-4 on a substantially dry basis wherein said member adsorbs said gases.

* * * * *